United States Patent Office 3,632,829
Patented Jan. 4, 1972

3,632,829
HALOGENATED MANDELANILIDE
CARBANILATES
Ignatius Schumacher, Webster Groves, and Joseph W. Baker, Kirkwood, Mo., assignors to Monsanto Company, St. Louis, Mo.
No Drawing. Filed Nov. 7, 1968, Ser. No. 774,169
Int. Cl. C07c 103/30
U.S. Cl. 260—472
9 Claims

ABSTRACT OF THE DISCLOSURE

This disclosure covers halogenated mandelanilide carbanilates as new chemical compounds. These compounds have been found to be useful in the control of bacteria.

---

This invention relates to a novel class of organic chemical compounds. More particularly, this invention is concerned with novel esters of carbanilic acid wherein the esters are derived from a mandelanilide. Such materials have been found to possess useful and unexpected biological activity.

The novel compounds of this invention have the formula

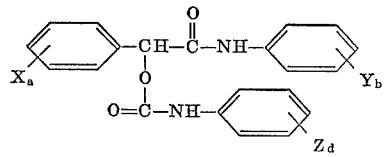

wherein X, Y and Z each represent halogen selected from chlorine and bromine, $a$, $b$ and $d$ are each integers selected from zero to three, and the sum of $a+b+d$ is at least two.

The carbanilic acid esters of this invention can be readily prepared by reacting a phenyl or halophenyl isocyanate with a halogenated or unhalogenated mandelanilide. Such a reaction is illustrated by the following equation

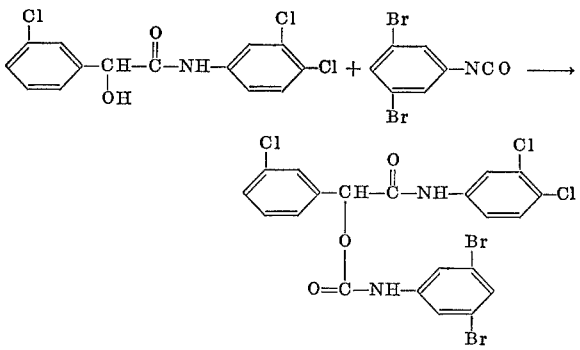

In practicing the preparations of this invention, it is often preferred to employ a tertiary amine to catalyze or facilitate the progress of the reaction. Examples of tertiary amines which can be so employed are triethylamine, quinoline, pyridine, and the like. It is also preferred to carry out the reaction in the presence of an inert organic solvent. Suitable solvents include benzene, toluene, xylene, the chlorinated benzenes, ethyl ether, propyl ether, tetrahydrofuran, and the like.

The reaction temperatures employed in the preparation of the compounds of this invention will vary from room temperature to the reflux temperatures of the reaction mixture. The specific temperature employed in any given preparation will be primarily dependent upon the particular reactants used therein. It should be noted that although the presence of both a tertiary amine and an inert organic solvent is preferred, neither of these materials is essential to the preparation of the compounds described herein.

The invention will be more fully understood by reference to the following examples which are set forth herein for the purpose of illustration only and which are not to be construed as limiting the scope of this invention in any manner.

EXAMPLE 1

A suitable reaction vessel is charged with 200 ml. of benzene. To this vessel there are then added 6.6 grams (0.02 mole) of 3',4,4'-trichloromandelanilide and 3.9 grams (0.021 mole) of 3,4-dichlorophenyl isocyanate. The reactants are stirred and 3 drops of triethylamine is added. The resultant solution is heated at reflux temperature for about 4 hours. The solids which form are collected and there is obtained 5.8 grams of 3',4,4'-trichloromandelanilide, 3,4-dichlorocarbanilate as a white solid, M.P. 211–213° C. Analysis shows 34.5% chlorine and 5.62% nitrogen as against calculated values of 34.2% and 5.40% respectively for $C_{21}H_{13}Cl_5N_2O_3$.

EXAMPLE 2

Following the detailed procedure set forth in Example 1, the reactants employed are 6.6 grams of 2,4,4'-trichloromandelanilide and 4.7 grams of 3,4,5-trichlorophenyl isocyanate. The product obtained is 2,4,4'-trichloromandelanilide, 3,4,5-trichlorocarbanilate.

EXAMPLE 3

Following the detailed procedure set forth in Example 1, the reactants employed are 9.3 grams of 3,3',5'-tribromomandelanilide and 3.2 grams of 4-chlorophenyl isocyanate. The product obtained is 3,3',5'-tribromomandelanilide, 4-chlorocarbanilate.

EXAMPLE 4

Following the detailed procedure set forth in Example 1, the reactants employed are 8.0 grams of 3,3',4,4',5'-pentachloromandelanilide and 3.9 grams of 3,4-dichlorophenyl isocyanate. The product obtained is 3,3',4,4',5-pentachloromandelanilide, 3,4-dichlorocarbanilate.

EXAMPLE 5

Following the detailed procedure set forth in Example 1, the reactants employed are 5.9 grams of 4,4'-dichloromandelanilide and 4.1 grams of 4-bromophenyl isocyanate. The product obtained is 4,4'-dichloromandelanilide, 4-bromocarbanilate.

EXAMPLE 6

Following the detailed procedure set forth in Example 1, the reactants employed are 5.2 grams of 4-chloromandelanilide and 3.2 grams of 3-chlorophenyl isocyanate. The product obtained is 4-chloromandelanilide, 3-chlorocarbanilate.

EXAMPLE 7

Following the detailed procedure set forth in Example 1, the reactants employed are 7.7 grams of 3',4'-dibromomandelanilide and 2.5 grams of phenyl isocyanate. The product obtained is 3',4'-dibromomandelanilide, carbanilate.

As stated above, the products of the present invention are useful as microbiocides adapted to be employed for the control of bacterial organisms. In a representative test, 3',4,4'-trichloromandelanilide, 3,4-dichlorocarbanilate is found to be effective against *Staphylococcus aureus* at a dilution in excess of 1 part per million. Further, when said compound is admixed with a well-known commercially available anionic detergent in a concentration of 0.5%, its effectiveness can also be demonstrated in a conventional home washing machine. Swatches of cloth inoculated with *Staphylococcus aureus* are found to be free of bacterial growth after laundering in a home washing machine using said admixed detergent. Similar activity is displayed by other and different carbanilic acid esters of this invention.

While the invention has been described herein with regard to certain specific embodiments, it is not so limited. It is to be understood that variations and modifications thereof may be made by those skilled in the art without departing from the spirit and scope of the invetnion.

The embodiments of the invention in which an exclusive property or privilege is claimed are defined as follows:

1. A compound of the formula

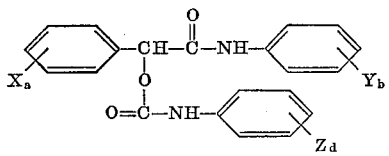

wherein X, Y and Z each represent halogen selected from chlorine and bromine, $a$, $b$ and $d$ are each integers selected from zero to three, and the sum of $a+b+d$ is at least two.

2. A compound as defined in claim 1 wherein X, Y and Z each represent chlorine.

3. A compound as defined in claim 1 wherein X, Y and Z each represent bromine.

4. A compound as defined in claim 1 wherein the sum of $a+b+d$ is 2.

5. A compound as defined in claim 1 wherein the sum of $a+b+d$ is 3.

6. A compound as defined in claim 1 wherein the sum of $a+b+d$ is 4.

7. A compound as defined in claim 1 wherein the sum of $a+b+d$ is 5.

8. A compound as defined in claim 1 wherein the sum of $a+b+d$ is 6.

9. A compound as defined in claim 1 which is 3′,4,4′-trichloromandelanilide, 3,4-dichlorocarbanilate.

References Cited
FOREIGN PATENTS 959,204   5/1964   Great Britain _____ 260—472

LORRAINE A. WEINBERGER, Primary Examiner

E. J. GLEIMAN, Assistant Examiner

U.S. Cl. X.R.

260—559 R; 424—309